United States Patent
Vasko et al.

(10) Patent No.: US 8,414,047 B2
(45) Date of Patent: Apr. 9, 2013

(54) RECONFIGURABLE CONSOLE REINFORCEMENT BRACKET

(75) Inventors: Melaina Vasko, Highland Township, MI (US); Christopher Biggs, South Lyon, MI (US); Thomas Mally, Beverly Hills, MI (US); Douglas Dawe, Milford, MI (US)

(73) Assignee: Nissan North America, Inc., Franklin, TN (US)

( * ) Notice: Subject to any disclaimer, the term of this patent is extended or adjusted under 35 U.S.C. 154(b) by 97 days.

(21) Appl. No.: 13/225,954

(22) Filed: Sep. 6, 2011

(65) Prior Publication Data

US 2013/0057010 A1    Mar. 7, 2013

(51) Int. Cl.
*B60P 3/00* (2006.01)

(52) U.S. Cl.
USPC .................. 296/24.3; 296/37.8; 248/213.2

(58) Field of Classification Search .................. 296/24.3, 296/37.1, 37.8; 248/200, 201, 213.2, 300
See application file for complete search history.

(56) References Cited

U.S. PATENT DOCUMENTS

| | | | | |
|---|---|---|---|---|
| 5,106,143 | A | * | 4/1992 | Soeters ........................ 296/37.8 |
| 5,335,751 | A | * | 8/1994 | Kuroki ........................... 180/336 |
| 5,540,180 | A | | 7/1996 | Kataumi et al. |
| 5,934,733 | A | | 8/1999 | Manwaring |
| 6,276,739 | B1 | | 8/2001 | Wich |
| 6,339,968 | B1 | | 1/2002 | Nagashima |
| 7,185,937 | B2 | * | 3/2007 | Sakakibara ................... 296/37.8 |
| 7,213,673 | B2 | | 5/2007 | Shabana et al. |
| 7,216,879 | B2 | | 5/2007 | Dean |
| 7,614,319 | B2 | | 11/2009 | Hermansson et al. |
| 2005/0116488 | A1 | * | 6/2005 | Sakakibara ................... 296/37.8 |
| 2005/0236859 | A1 | * | 10/2005 | Sakakibara et al. ......... 296/37.8 |
| 2005/0242604 | A1 | * | 11/2005 | Bonnes et al. ............... 296/35.1 |
| 2006/0202464 | A1 | * | 9/2006 | Scheib .......................... 280/784 |
| 2007/0138819 | A1 | * | 6/2007 | Akimoto et al. ............. 296/37.8 |
| 2007/0181763 | A1 | * | 8/2007 | Babian ......................... 248/300 |
| 2010/0270456 | A1 | * | 10/2010 | Stoner .......................... 248/672 |

FOREIGN PATENT DOCUMENTS

| | | |
|---|---|---|
| EP | 0 279 087 | 8/1988 |
| EP | 1 055 564 | 11/2000 |
| GB | 1 269 122 | 4/1972 |
| GB | 2 349 434 | 11/2000 |
| JP | 2002-337564 | 11/2002 |

* cited by examiner

*Primary Examiner* — Lori Lyjak
(74) *Attorney, Agent, or Firm* — Young Basile Hanlon & MacFarlane, P.C.

(57) ABSTRACT

A reconfigurable console reinforcement bracket includes a first frame and first and second extension arms. In a first configuration, the first extension arm is connected to a first lateral side of the first frame at a first longitudinal end of the first frame and the second extension arm is connected to a second lateral side of the first frame at the first longitudinal end of the first frame such that the first and second extension arms extend beyond the first longitudinal end. In a second configuration, the first extension arm is connected to the first lateral side of the first frame at the second longitudinal end of the first frame and the second extension arm is connected to the second lateral side of the first frame at the second longitudinal end of the first frame such that the first and second extension arms extend beyond the second longitudinal end.

20 Claims, 7 Drawing Sheets

RECONFIGURABLE CONSOLE REINFORCEMENT BRACKET

TECHNICAL FIELD

The disclosure relates to the field of interior components for motor vehicles, and more particularly, to a reconfigurable console reinforcement bracket.

BACKGROUND

Motor vehicles are often intended to be sold in multiple markets, such as different countries continents, or regions. These vehicles are typically designed so that they can be configured differently for each market. The configurations can vary based on driver preferences, driving style differences, country-specific regulatory requirements, and other factors.

As an example, the configuration of vehicular traffic flow on two-way streets is not consistent across all countries. In countries such as the United States of America and Mexico, vehicles on a two-way street drive along the right hand side of the street. In these countries, either by law or by driver preference, vehicles are typically configured as left-hand drive models, meaning that the driver controls are positioned on the left hand side of the vehicle. In countries such as the United Kingdom and Japan, vehicles on a two-way street drive along the left hand side of the street. In these countries, either by law or by driver preference, vehicles are typically configured as right-hand drive models, meaning that the driver controls are positioned on the right hand side of the vehicle.

To satisfy the requirement of providing left hand drive vehicles for some markets and right hand drive vehicles for other markets, some vehicle manufacturers will simply sell dedicated models that are intended to be sold only in one of the two types of markets. Given the significant investment involved in vehicle design and production, however, other vehicle manufacturers choose to produce a single vehicle model in both right hand drive and left hand drive configurations. This allows one vehicle model to be sold in both left hand drive markets and right hand drive markets, but requires that different parts be produced for each version. The number of configuration-specific parts can be reduced by designing the parts to be symmetrical laterally, that is, in a cross-car direction. To the extent that this cannot be done, manufacturing costs are increased by the need to design and build the additional tooling that will be needed to manufacture the configuration-specific parts.

SUMMARY

Reconfigurable console reinforcement brackets for motor vehicles are taught herein, as well as vehicle consoles and vehicles that incorporate reconfigurable console reinforcement brackets.

One reconfigurable console reinforcement bracket taught herein includes a first frame, a first extension arm, and a second extension arm. The first frame has a first lateral side, a second lateral side, a first longitudinal end, and a second longitudinal end. The first frame is connectable to the first extension arm and the second extension arm to define a first configuration and a second configuration. In the first configuration, the first extension arm is connected to the first lateral side of the first frame at the first longitudinal end of the first frame and the second extension arm is connected to the second lateral side of the first frame at the first longitudinal end of the first frame such that the first and second extension arms extend beyond the first longitudinal end of the first frame. In the second configuration, the first extension arm is connected to the first lateral side of the first frame at the second longitudinal end of the first frame and the second extension arm is connected to the second lateral side of the first frame at the second longitudinal end of the first frame such that the first and second extension arms extend beyond the second longitudinal end of the first frame.

A vehicle taught herein includes a vehicle floor, first and second floor brackets, and a reconfigurable console reinforcement bracket. The first and second floor brackets are connected to the vehicle floor and spaced apart from one another in a lateral direction of the vehicle. The reconfigurable console reinforcement bracket is connected to the first and second floor brackets. The reconfigurable console reinforcement bracket includes a first frame having a first lateral side, a second lateral side, a first longitudinal end, a second longitudinal end, a mounting bracket that is positioned on the first lateral side, and a second mounting bracket that is positioned on the second lateral side. The reconfigurable console reinforcement bracket also includes a first extension arm and a second extension arm. The first frame is connectable to the first extension arm and the second extension arm to define a first configuration of the reconfigurable console reinforcement bracket and a second configuration of the reconfigurable console reinforcement bracket. In the first configuration, the first extension arm is connected to the first lateral side of the first frame at the first longitudinal end of the first frame and the second extension arm is connected to the second lateral side of the first frame at the first longitudinal end of the first frame such that the first and second extension arms extend beyond the first longitudinal end of the first frame. In the second configuration, the first extension arm is connected to the first lateral side of the first frame at the second longitudinal end of the first frame and the second extension arm is connected to the second lateral side of the first frame at the second longitudinal end of the first frame such that the first and second extension arms extend beyond the second longitudinal end of the first frame.

A vehicle console assembly taught herein includes a reconfigurable console reinforcement bracket and a vehicle console. The reconfigurable console reinforcement bracket includes a first frame having a first lateral side, a second lateral side, a first longitudinal end, and a second longitudinal end. The reconfigurable console reinforcement bracket also includes a first extension arm and a second extension arm. The first frame is connectable to the first extension arm and the second extension arm to define a first configuration of the reconfigurable console reinforcement bracket and a second configuration of the reconfigurable console reinforcement bracket. In the first configuration, the first extension arm is connected to the first lateral side of the first frame at the first longitudinal end of the first frame and the second extension arm is connected to the second lateral side of the first frame at the first longitudinal end of the first frame such that the first and second extension arms extend beyond the first longitudinal end of the first frame. In the second configuration, the first extension arm is connected to the first lateral side of the first frame at the second longitudinal end of the first frame and the second extension arm is connected to the second lateral side of the first frame at the second longitudinal end of the first frame. The vehicle console is at least partially supported by the reconfigurable console reinforcement bracket such that the first and second extension arms extend beyond the second longitudinal end of the first frame.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
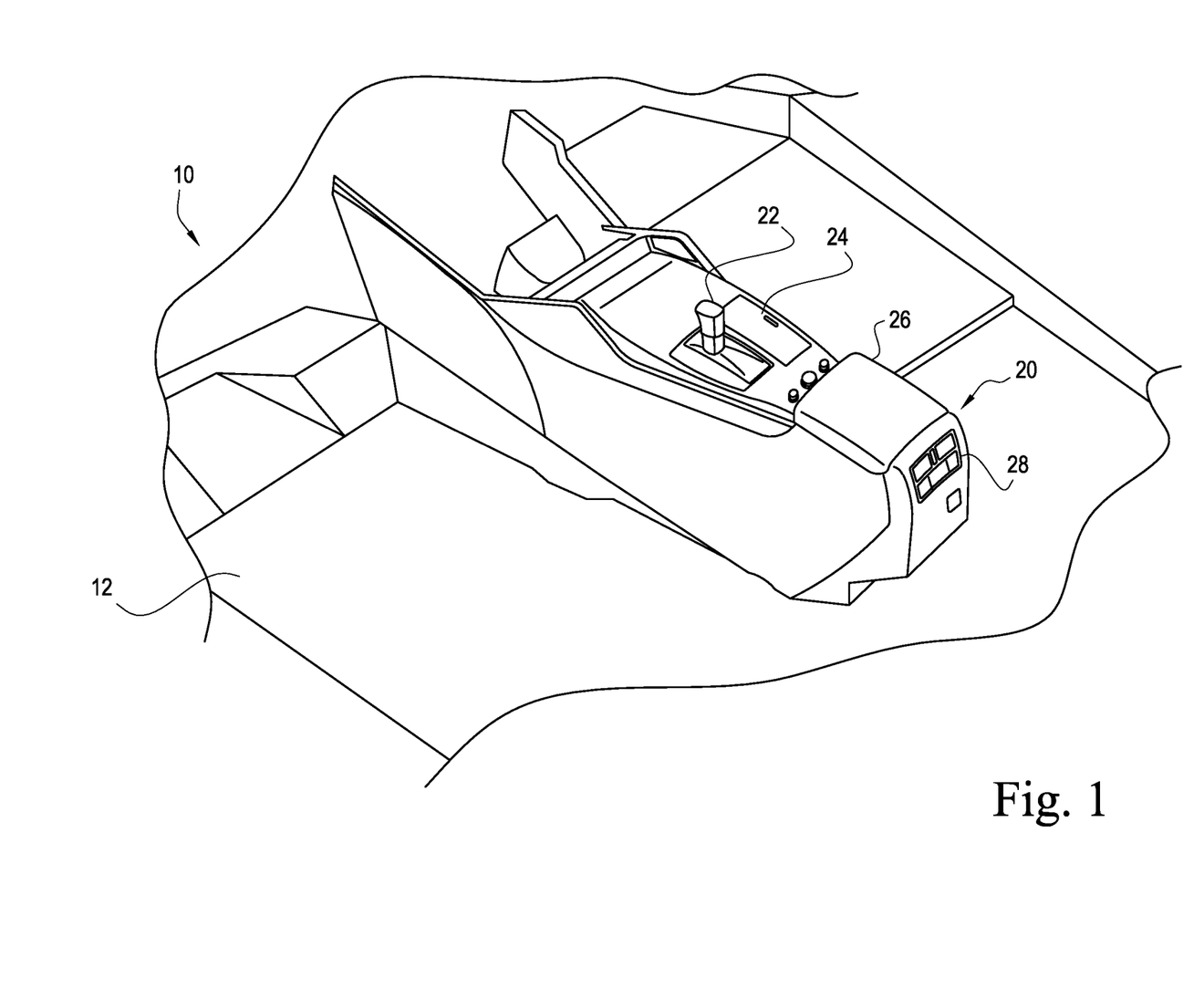
FIG. 1 is a perspective view showing a vehicle console installed in a vehicle.

FIG. 1 shows a vehicle console 20 that is installed within a vehicle 10 having a vehicle floor 12. The vehicle console 20 is disposed within the interior, or passenger compartment, of the vehicle 10, typically in an area that is disposed between two seats (not shown) of the vehicle 10. Various systems, controls, and other features are incorporated in or positioned on the vehicle console 20, such as a shift lever 22 that allows selection of a mode or gear of the transmission (not shown) of the vehicle 10, compartments 24, 26 that are defined by the vehicle console 20, and climate control vents 28 that are disposed on the vehicle console 20.

Figure 2:
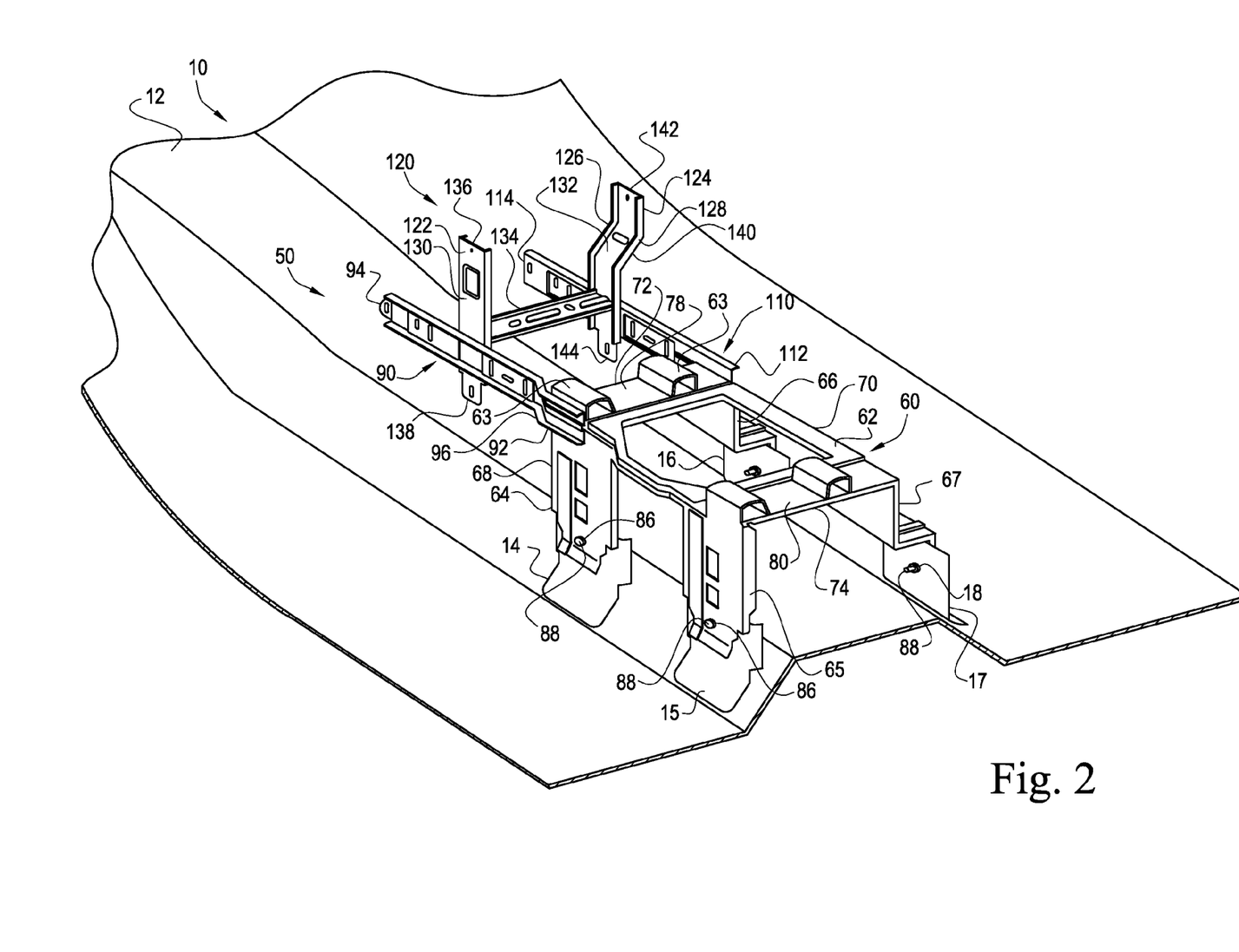
FIG. 2 is a perspective view showing a reconfigurable console reinforcement bracket connected to a floor of the vehicle in a first configuration.
Figure 3:
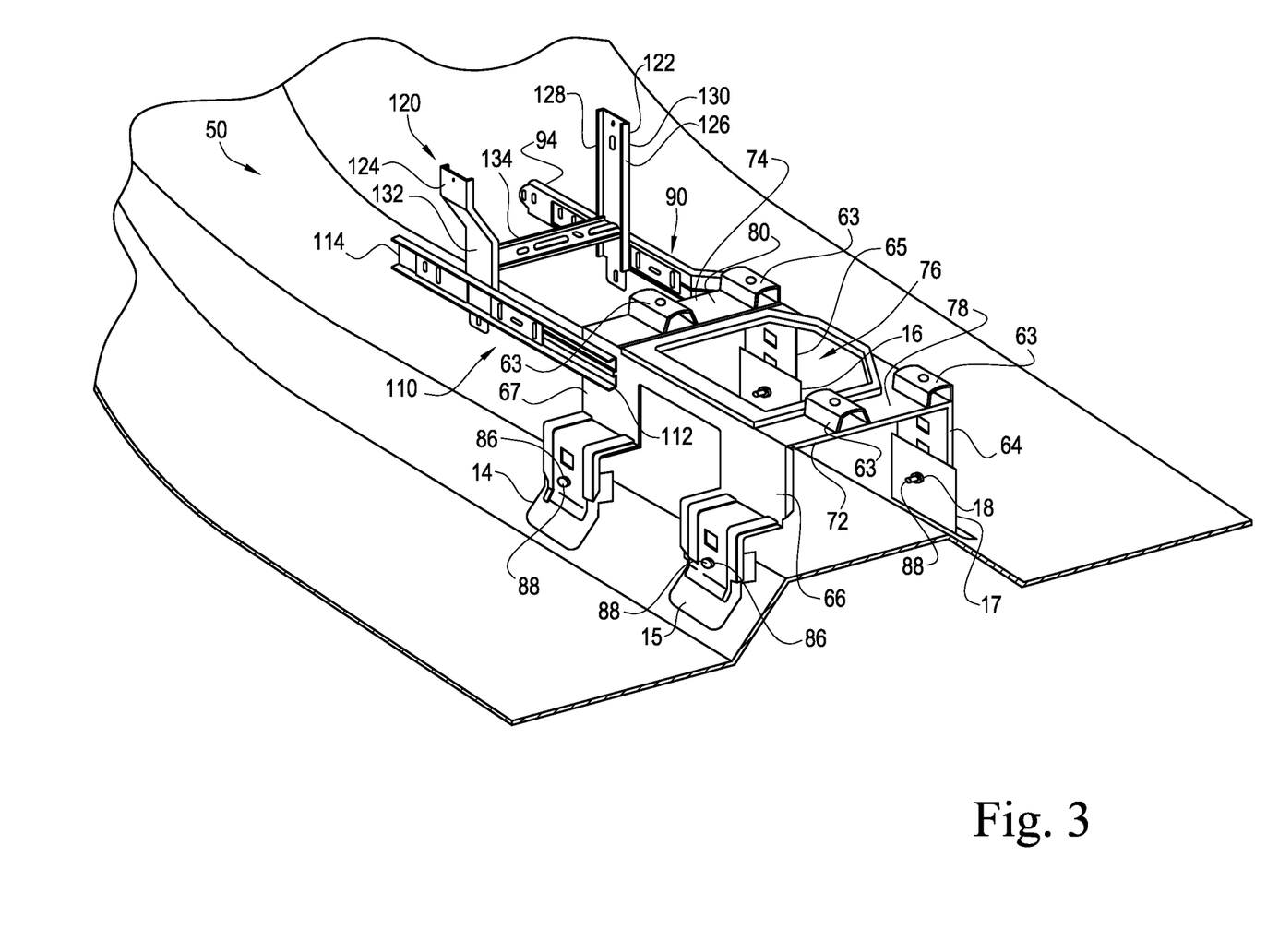
FIG. 3 is a perspective view showing the reconfigurable console reinforcement bracket connected to the floor of the vehicle in a second configuration.

As shown in FIGS. 2-3, the vehicle console 20 is supported by a reconfigurable console reinforcement bracket, such as the bracket 50. The bracket 50 includes a first frame 60, a first extension arm 90, a second extension arm 110, and a second frame 120. The first frame 60, the first extension arm 90, the second extension arm 110, and the second frame 120 are connectable to one another to define a first configuration (FIG. 2) for the bracket 50 and a second configuration (FIG. 3) for the bracket 50, as will be explained further herein. Each of these portions of the bracket 50 is a substantially rigid structure that is formed from a suitable material, such as metal. The bracket 50, when assembled in either of the first configuration or the second configuration, is substantially rigid and possesses sufficient strength to support the vehicle console 20.

The bracket 50 is connected to the vehicle floor 12 by a first lateral pair of floor brackets including a front left-side floor bracket 14 and a rear left side floor bracket 15, and a second lateral pair of brackets including a front right-side floor bracket 16 and a rear right side floor bracket 17. The right-side floor brackets 14, 15 and the left side floor brackets 16, 17 can be portions of the vehicle floor 12 or connected to the vehicle floor 12 in any suitable manner. Each of the floor brackets 14-17 can include a structure suitable for connecting the bracket 50 to the vehicle floor 12, such as an aperture 18. The second and fourth floor brackets 15 and 17, respectively, are disposed slightly higher than the first and third floor brackets 14 and 16, respectively, as will be explained in greater detail below. However, the first through fourth floor brackets 14-17 can optionally be disposed at the same height with respect to the vehicle floor 12.

The first frame 60 includes a top portion 62 and a plurality of legs, namely a first leg 64, a second leg 65, a third leg 66, and a fourth leg 67. The first frame 60 extends between a first lateral side 68, a second lateral side 70, a first longitudinal end 72, and a second longitudinal end 74.

The first frame 60 defines an opening 76 that extends downward through the top portion 62. A first cross member 78 is disposed adjacent to the first longitudinal end 72 of the first frame 60. A second cross member 80 is disposed adjacent to the second longitudinal end 74 of the first frame 60. The first cross member 78 and the second cross member 80 each extend from the first lateral side 68 to the second lateral side 70. The opening 76 is disposed between the first cross member 78 and the second cross member 80, and extends a majority of the distance from the first lateral side 68 to the second lateral side 70, as well as a majority of the distance from the first cross member 78 to the second cross member 80.

A plurality of mounting elements 63 are positioned on the top portion 62 of the first frame 60. The plurality of mounting elements 63 is positioned in a longitudinally symmetrical array, that is, an array that is symmetrically arranged in a longitudinal direction of the first frame 60. For example the plurality of mounting elements 63 can include two mounting elements that are positioned on the first cross member 78 and two mounting elements that are positioned on the second cross member 80. The plurality of mounting elements 63 can include any suitable type of mounting structures, such as apertures, fasteners, or combinations of apertures and fasteners.

The first through fourth legs 64-67 all extend generally downward with respect to the top portion 62 of the first frame 60. The first leg 64 and the second leg 65 are positioned at or near the first lateral side 68 of the first frame 60. The third leg 66 and the fourth leg 67 are positioned at or near the second lateral side 70 of the first frame 60. The first leg 64 and the third leg 66 are positioned at or near the first longitudinal end 72 of the first frame 60. The second leg 65 and the fourth leg 67 are positioned at or near the second longitudinal end 74 of the first frame 60.

Figure 7:
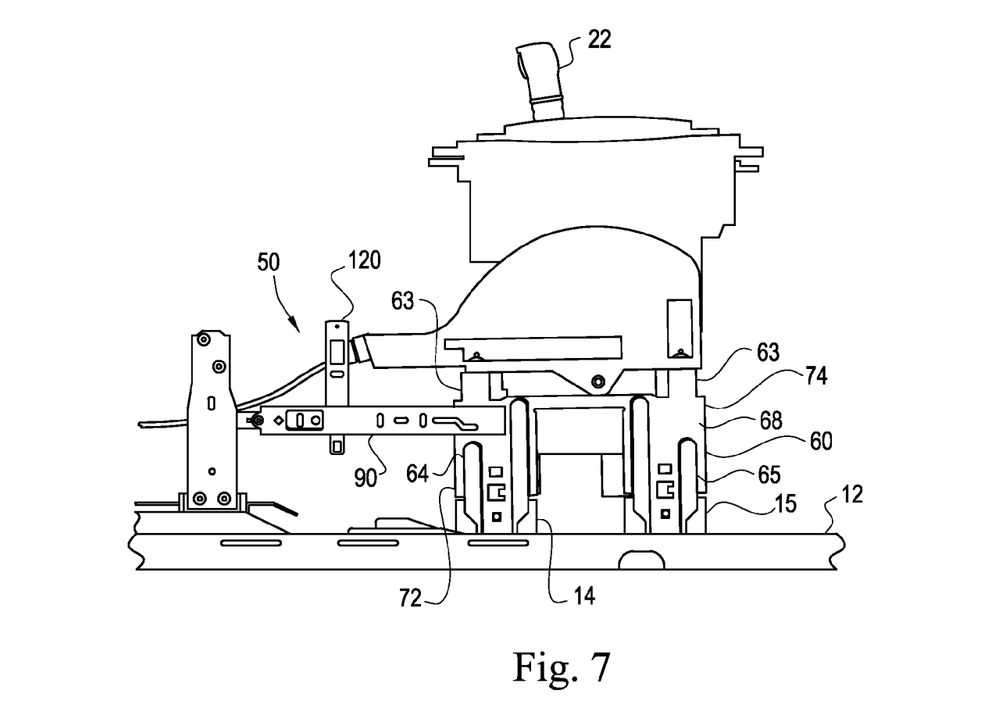
FIG. 7 is a left side view showing the reconfigurable console reinforcement bracket connected to the floor of the vehicle in the first configuration.
Figure 8:
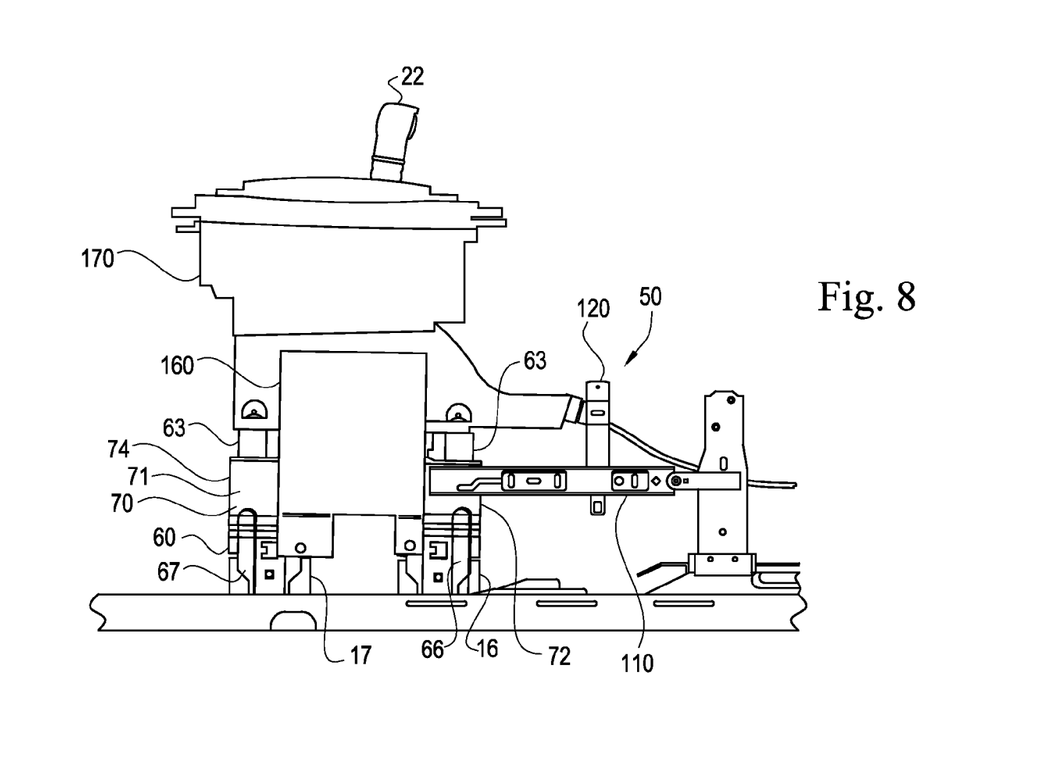
FIG. 8 is a right side view showing the reconfigurable console reinforcement bracket connected to the floor of the vehicle in the first configuration.

The first through fourth legs 64-67 each include one or more structures that are suitable for connecting the first frame 60 to the vehicle floor 12. In the illustrated example, each of the first through fourth legs 64-67 includes an aperture 86. Fasteners 88 extend through each of the apertures 86 of the first through fourth legs 64-67 and through each of the apertures 18 of the floor brackets 14-17 to connect the first frame 60 to the vehicle floor 12. As shown in FIGS. 7 and 8, the first through fourth legs 64-67 of the first frame 60 are substantially equal in length. Therefore, the first frame 60 is disposed at a desired angle of incline in the longitudinal direction of the vehicle 10 when the first through fourth legs 64-67 of the first frame 60 are connected to the first through fourth floor brackets 14-17 of the vehicle floor 12. In other words, the resulting angle of incline of the first frame 60 is determined by the relative heights of the floor brackets 14-17 of the vehicle floor 12. However, since the first through fourth legs 64-67 of the first frame 60 are substantially equal in length, the resulting angle and direction of incline of the first frame 60 remains consistent in both the first and second configurations.

In the first configuration of the bracket 50, the first leg 64 is connected to the first floor bracket 14, the second leg 65 is connected to the second floor bracket 15, the third leg 66 is connected to the third floor bracket 16, and the fourth leg 67 is connected to the fourth floor bracket 17. In the second configuration, the first leg 64 is connected to the fourth floor bracket 17, the second leg 65 is connected to the third floor bracket 16, the third leg 66 is connected to the second floor bracket 15, and the fourth leg 67 is connected to the first floor bracket 14. Thus, the first floor bracket 14 and the second floor bracket 15 define a first lateral pair of brackets, to which the first lateral side 68 of the first frame 60 is connected in the first configuration, and to which the second lateral side 70 of the first frame 60 is connected in the second configuration. The third floor bracket 16 and the fourth floor bracket 17 define a second lateral pair of brackets, to which the second lateral side 70 of the first frame 60 is connected in the first configuration, and to which the first lateral side 68 of the first frame 60 is connected in the second configuration.

The first frame 60 is substantially symmetrical in the longitudinal direction, that is, about a line of symmetry that lies between the first longitudinal end 72 and the second longitudinal end 74, and that extends substantially perpendicular to the first lateral side 68 and the second lateral side 70.

The first frame 60 is substantially asymmetrical in a lateral direction. As one example of the lateral asymmetry of the first frame 60, the first lateral side 68 of the first frame 60 has a substantially straight, upright configuration, and the second lateral side 70 of the first frame 60 has a stepped configuration that is defined on each of the third leg 66 and the fourth leg 67 by a first upright portion 81, a second upright portion 82 and a lateral portion 83 (FIG. 9), as will be explained further herein.

The first extension arm 90 is connected to the first lateral side 68 of the first frame 60 by welding, fasteners, or any other suitable structure or method. The first extension arm 90 extends from a first end 92 to a second end 94. The first end 92 is connected to the first frame 60 in the first configuration and the second configuration of the bracket 50. The second end 94 is distal to the first frame 60 in the first configuration and the second configuration of the bracket 50. The first end 92 of the first extension arm 90 can be connected to the first frame 60 at either of the first longitudinal end 72 or the second longitudinal end 74 of the first frame 60, depending on the configuration of the bracket 50.

The first extension arm 90 is substantially elongate, in that it has a length from the first end 92 to the second end 94 that is large as compared to its width and depth. As installed with respect to the vehicle 10, the first extension arm 90 extends in the longitudinal direction of the vehicle 10.

The first extension arm 90 also includes a lateral offset portion 96 that is disposed between the first end 92 and the second end 94, and is located near the first end 92. The lateral offset portion 96 includes one or more bends that cause the lateral position of the first end 92 to be offset with respect to the second end 94 in the lateral direction of the vehicle 10, toward the second lateral side 70 of the first frame 60. For example, the lateral offset portion 96 can include a pair of bends of equal magnitude in opposite directions. As a result, the first end 92 and the second and 94 of the first extension arm 90 can extend substantially parallel to one another, despite being laterally offset with respect to each other.

The second extension arm 110 is connected to the second lateral side 70 of the first frame 60 by welding, fasteners, or any other suitable structure or method. The second extension arm 110 extends from a first end 112 to a second end 114. The first end 112 is connected to the first frame 60 in the first configuration and the second configuration of the bracket 50. The second end 114 is distal to the first frame 60 in the first configuration and the second configuration of the bracket 50. The first end 112 of the second extension arm 110 can be connected to the first frame 60 at either of the first longitudinal end 72 or the second longitudinal end 74 of the first frame 60, depending on the configuration of the bracket 50, as will be described further herein.

The second extension arm 110 is substantially elongate, in that it has a length from the first end 112 to the second end 114 that is large as compared to its width and depth. As installed with respect to the vehicle 10, the second extension arm 110 extends in the longitudinal direction of the vehicle 10. The second extension arm 110 can be substantially straight between the first end 112 and the second end 114.

In the first configuration of the bracket 50, the first extension arm 90 is connected to the first lateral side 68 of the first frame 60 at the first longitudinal end 72 of the first frame 60, and the second extension arm 110 is connected to the second lateral side 70 of the first frame 60 at the first longitudinal end 72 of the first frame 60, such that the first and second extension arms 90, 92 extend beyond the first longitudinal end 72 of the first frame 60. In the second configuration of the bracket 50, the first extension arm 90 is connected to the first lateral side 68 of the first frame 60 at the second longitudinal end 74 of the first frame 60, and the second extension arm 110 is connected to the second lateral side 70 of the first frame 60 at the second longitudinal end 74 of the first frame 60, such that the first and second extension arms 90, 92 extend beyond the second longitudinal end 74 of the first frame 60.

The second frame 120 has a first lateral side 122 that is connected to the first extension arm 90 in the first configuration and the second configuration of the bracket 50. The second frame 120 also has a second lateral side 124 that is connected to the second extension arm 110 in the first configuration and the second configuration of the bracket 50. The second frame 120 also has a first longitudinal end 126 and a second longitudinal end 128. In the first configuration, the first longitudinal end 126 of the second frame 120 is oriented away from the first frame 60, and the second longitudinal end 128 of the second frame 120 is oriented toward the first frame 60. In the second configuration, the first longitudinal end 126 of the second frame 120 is oriented toward the first frame 60, and the second longitudinal end 128 of the second frame 120 is oriented away from the first frame 60.

The second frame 120 has a substantially H-shaped configuration that is defined by a first upright member 130, a second upright member 132, and a cross member 134 that extends between the first upright member 130 and the second upright member 132. The first upright member 130 is located on the first lateral side 122 of the second frame 120, and the second upright member 132 is located on the second lateral side 124 of the second frame 120. The first upright member 130 is substantially straight between an upper end 136 and a lower end 138 thereof, while the second upright member 132 has an offset configuration that is defined by a lateral offset portion 140 that is located between and upper end 142 and a lower end 144 thereof.

The second frame 120 is substantially symmetrical in the longitudinal direction, but is asymmetrical in the lateral direction. An example of lateral asymmetry of the second frame 120 is the substantially straight configuration of the first upright member 130 as compared to the offset configuration of the second upright member 132.

The second frame 120 is connected to the first extension arm 90 and the second extension arm 110 by welding, fasteners, or any other suitable structure or method. The second frame 120 is connected to the first extension arm 90 and the second extension arm 110 such that the second frame 120 is spaced from the first frame 60, and the spacing between the first frame 60 and the second frame 120 is not dependent upon the configuration of the bracket 50, such that the distance between the first frame 60 and the second frame 120 is the same in the first configuration and the second configuration of the bracket 50.

Figure 5:
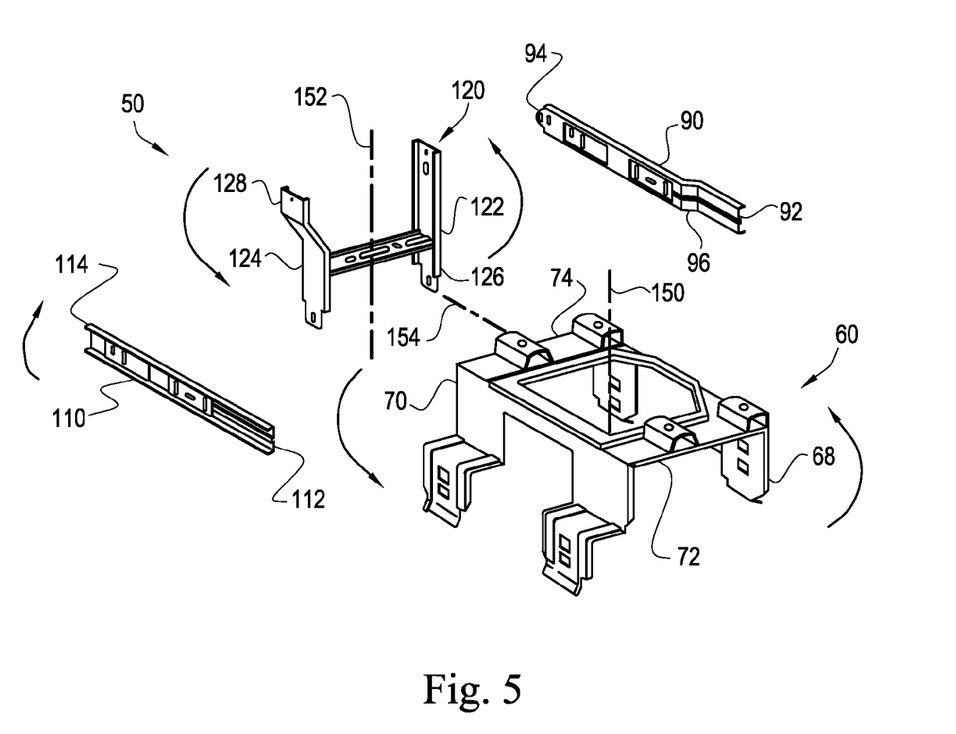
FIG. 5 is an exploded perspective view showing the reconfigurable console reinforcement bracket in the second configuration.
Figure 6:
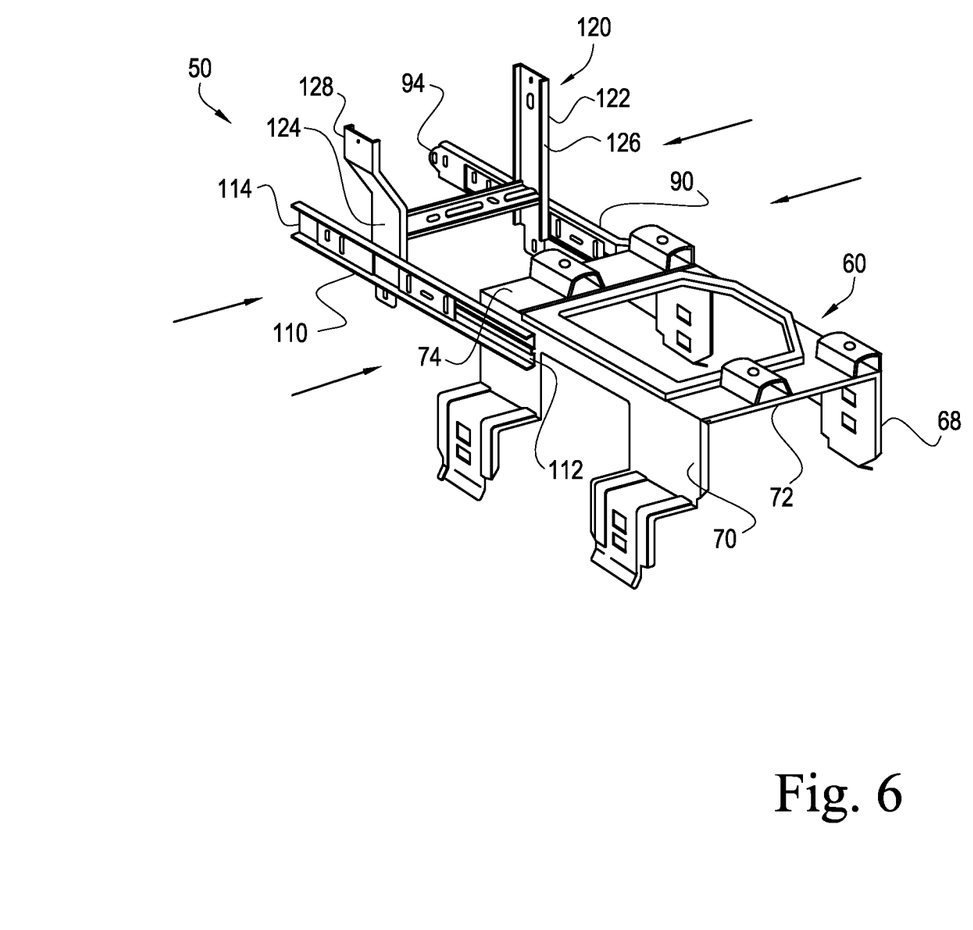
FIG. 6 is a perspective view showing the reconfigurable console reinforcement bracket fully assembled in the second configuration.

The first configuration and the second configuration of the bracket 50 will now be explained in greater detail with reference to FIGS. 4-6, which illustrate reconfiguration of the bracket 50 from the first configuration to the second configuration.

Figure 4:
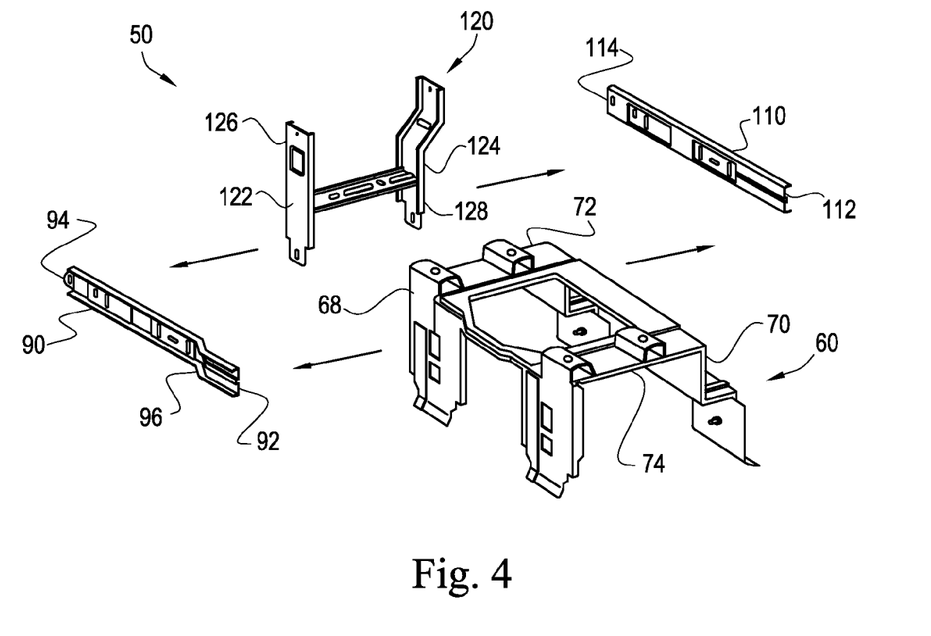
FIG. 4 is an exploded perspective view showing the reconfigurable console reinforcement bracket in the first configuration.

Starting from the first configuration, the first frame 60, the first extension arm 90, the second extension arm 110, and the second frame 120 are disconnected and separated from one another, as shown in FIG. 4. To prepare the bracket 50 for assembly into the second configuration, the first frame 60, the first extension arm 90, the second extension arm 110, and the second frame 120 are reoriented to the positions shown in FIG. 5. In particular, the first frame 60 is rotated 180 degrees about a first vertical axis 150, the second frame 120 is rotated about a second vertical axis 152, and the first second extension arms 90, 110 are rotated in unison about a horizontal axis 154 that lies between them and extends in the longitudinal direction of the vehicle 10. From this position, the first frame 60, the first extension arm 90, the second extension arm 110, and the second frame 120 are moved into engagement with one another and are connected to one another to establish the second configuration for the bracket 50 (FIG. 6).

Figure 9:
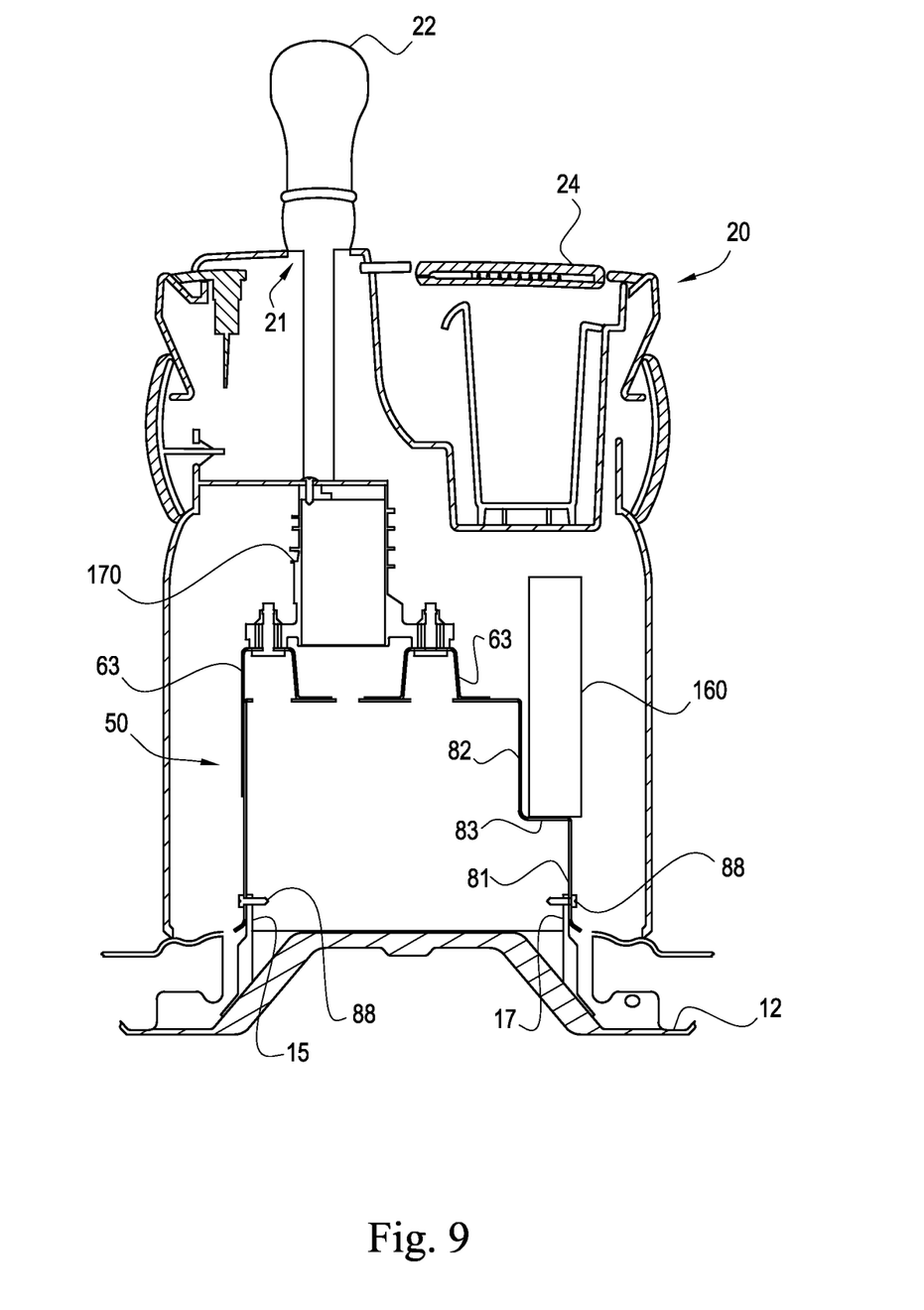
FIG. 9 is a rear cross-sectional view showing the vehicle console and the reconfigurable console reinforcement bracket in the first configuration.

As shown in FIGS. 7-9, one or more accessory modules can be mounted to the bracket 50. As a first example, a vehicle controller 160 is disposed within the vehicle console 20, and clearance within the vehicle console 20 is provided by the stepped configuration of the first frame 60. The first upright portion 81 at the second lateral side 70 of the first frame 60 is near or adjacent to an outer wall of the vehicle console 20 in the lateral direction of the vehicle 10. The second upright portion 82 is laterally offset with respect to the first upright portion 81 by the lateral portion 83, which can extend substantially horizontally, and thus, the second upright portion 82 is laterally spaced from the outer wall of the vehicle console 20. The vehicle controller 160 is positioned between the second upright portion 82 and the vehicle console 20 in the lateral direction of the vehicle 10.

A second example of an accessory module that can be mounted to the bracket 50 is a shifter module 170 that includes the shift lever 22. The shifter module 170 is connected to the top portion 62 of the first frame 60 by the plurality of mounting elements 63. The shift lever 22 of the shifter module 170 extends through an opening 21 that is defined through the vehicle console 20.

It will be appreciated from the foregoing disclosure that the bracket 50 is capable of being oriented and used in vehicles with both right and left hand driving layouts. The first frame 60 includes the stepped configuration, which allows an accessory module, such as the vehicle controller 160, to be mounted to the bracket 50. This makes the first frame 60 non-symmetrical in the lateral direction of the vehicle 10. Even if the first frame 60 has a desired angle of incline in the longitudinal direction of the vehicle 10 for styling or other purposes, the floor brackets 14-17 can be disposed at different heights with the legs 64-67 of the first frame 60 being equal in height so that the angle of incline is achieved consistently in both the first and second configurations. This allows the first frame 60 to be rotated 180 degrees about the first vertical axis 150 so that it can be used in an opposite hand driving layout. The first and second extension arms 90, 110 span between the first frame 60 and the second frame 120. Despite the fact that the first and second extension arms 90, 110 are neither identical nor symmetrical across the lateral direction of the vehicle 10, the first and second extension arms 90, 110 can be rotated 180 degrees as a pair about the horizontal axis 154 and mounted to the first frame 60 in order to accommodate the opposite hand driving layout. The first upright member 130 and the second upright member 132 of the second frame 120 are also not identical, but the second frame 120 can be rotated about the second vertical axis 152 similarly to but independent of the rotated first frame 60. This allows for economical use of parts while still providing attractive interior design elements.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A reconfigurable console reinforcement bracket, comprising:
   a first frame having a first lateral side, a second lateral side, a first longitudinal end, and a second longitudinal end;
   a first extension arm; and
   a second extension arm,
   wherein the first frame is connectable to the first extension arm and the second extension arm to define a first configuration, in which the first extension arm is connected to the first lateral side of the first frame at the first longitudinal end of the first frame and the second extension arm is connected to the second lateral side of the first frame at the first longitudinal end of the first frame such that the first and second extension arms extend beyond the first longitudinal end of the first frame, and a second configuration, in which the first extension arm is connected to the first lateral side of the first frame at the second longitudinal end of the first frame and the second extension arm is connected to the second lateral side of the first frame at the second longitudinal end of the first frame such that the first and second extension arms extend beyond the second longitudinal end of the first frame.

2. The reconfigurable console reinforcement bracket of claim 1, wherein the first frame is substantially symmetrical in a longitudinal direction of the first frame.

3. The reconfigurable console reinforcement bracket of claim 1, wherein the first frame is substantially asymmetrical in a lateral direction of the first frame.

4. The reconfigurable console reinforcement bracket of claim 1, wherein the first frame includes a top portion and plurality of mounting elements that are positioned on the top portion in an array that is symmetrically arranged in a longitudinal direction of the first frame.

5. The reconfigurable console reinforcement bracket of claim 1, wherein the second lateral side of the first frame has a stepped configuration.

6. The reconfigurable console reinforcement bracket of claim 5, wherein the first extension arm includes a first end that is connected to the first frame in the first configuration and the second configuration, a second end that is distal to the first frame in the first configuration and the second configuration, and a lateral offset portion disposed between the first end and the second end.

7. The reconfigurable console reinforcement bracket of claim 1, further comprising:
a second frame that is connected to the first extension arm and the second extension arm in the first configuration and the second configuration.

8. The reconfigurable console reinforcement bracket of claim 7, wherein the second frame includes a first lateral side that is connected to the first extension arm in the first configuration and the second configuration, a second lateral side that is connected to the second extension arm in the first configuration and the second configuration, a first longitudinal end that is oriented toward the first frame in the second configuration, and a second longitudinal end that is oriented toward the first frame in the first configuration.

9. The reconfigurable console reinforcement bracket of claim 8, wherein a distance between the first frame and the second frame in the first configuration is equal to a distance between the first frame and the second frame in the second configuration.

10. The reconfigurable console reinforcement bracket of claim 8, wherein the second frame includes a first upright member at the first lateral side, a second upright member at the second lateral side, and a cross member that extends between the first upright member and the second upright member.

11. The reconfigurable console reinforcement bracket of claim 8, wherein the second frame is asymmetrical in a lateral direction of the first frame.

12. The reconfigurable console reinforcement bracket of claim 8, wherein the second frame is substantially symmetrical in a longitudinal direction of the first frame.

13. A vehicle, comprising:
a vehicle floor;
first and second floor brackets that are connected to the vehicle floor and spaced apart from one another in a lateral direction of the vehicle;
a reconfigurable console reinforcement bracket that is connected to the first and second floor brackets, comprising:
a first frame having a first lateral side, a second lateral side, a first longitudinal end, a second longitudinal end, a first mounting bracket positioned on the first lateral side, and a second mounting bracket positioned on the second lateral side,
a first extension arm, and
a second extension arm,
wherein the first frame is connectable to the first extension arm and the second extension arm to define a first configuration of the reconfigurable console reinforcement bracket, in which the first extension arm is connected to the first lateral side of the first frame at the first longitudinal end of the first frame and the second extension arm is connected to the second lateral side of the first frame at the first longitudinal end of the first frame such that the first and second extension arms extend beyond the first longitudinal end of the first frame, and a second configuration of the reconfigurable console reinforcement bracket, in which the first extension arm is connected to the first lateral side of the first frame at the second longitudinal end of the first frame and the second extension arm is connected to the second lateral side of the first frame at the second longitudinal end of the first frame such that the first and second extension arms extend beyond the second longitudinal end of the first frame.

14. The vehicle of claim 13, wherein the first mounting bracket of the first frame is connected to the first floor bracket and the second mounting bracket of the first frame is connected to the second floor bracket when the reconfigurable console reinforcement bracket is in the first configuration, and the first mounting bracket of the first frame is connected to the second floor bracket and the second mounting bracket of the first frame is connected to the first floor bracket when the reconfigurable console reinforcement bracket is in the second configuration.

15. The vehicle of claim 13, further comprising:
a vehicle console that is at least partially supported by the reconfigurable console reinforcement bracket.

16. The vehicle of claim 15, wherein a first lateral side of the vehicle console is positioned adjacent to the first lateral side of the first frame and a second lateral side of the vehicle console is positioned adjacent to the second lateral side of the first frame when the reconfigurable console reinforcement bracket is in the first configuration, and the first lateral side of the vehicle console is positioned adjacent to the second lateral side of the first frame and the second lateral side of the vehicle console is positioned adjacent to the first lateral side of the first frame when the reconfigurable console reinforcement bracket is in the second configuration.

17. The vehicle of claim 15, further comprising:
a vehicle controller disposed within the vehicle console,
wherein the first frame has a stepped configuration defined by a first portion of the second lateral side of the first frame, which is adjacent to an outer wall of the vehicle console, and a second portion of the second lateral side of the first frame, which is spaced from the outer wall of the vehicle console, and the vehicle controller is disposed between the vehicle console and the second portion of the second lateral side of the first frame.

18. The reconfigurable console reinforcement bracket of claim 15, further comprising:
a shifter module including a lever,
wherein the first frame includes a top portion and plurality of mounting elements that are positioned on the top portion in an array that is symmetrically arranged in a longitudinal direction of the vehicle, the plurality of mounting elements connect the shifter module to the first frame, and the lever extends through an opening in the vehicle console.

19. A vehicle console assembly, comprising:
a reconfigurable console reinforcement bracket, comprising:
a first frame having a first lateral side, a second lateral side, a first longitudinal end, and a second longitudinal end,
a first extension arm, and
a second extension arm,
wherein the first frame is connectable to the first extension arm and the second extension arm to define a first configuration of the reconfigurable console reinforcement bracket, in which the first extension arm is connected to the first lateral side of the first frame at the first longitudinal end of the first frame and the second extension arm is connected to the second lateral side of the first frame at the first longitudinal end of the first frame such that the first and second extension arms extend beyond the first longitudinal end of the first frame, and a second configuration of the reconfigurable console reinforcement bracket, in which the first extension arm is connected to the first lateral side of the first frame at the second longitudinal end of the first frame and the second extension arm is connected to the second lateral side of the first frame at the second longitudinal end of the first frame such that the first and second extension arms extend beyond the second longitudinal end of the first frame; and a vehicle console that is at least partially supported by the reconfigurable console reinforcement bracket.

20. The vehicle of claim 19, wherein a first lateral side of the vehicle console is positioned adjacent to the first lateral side of the first frame and a second lateral side of the vehicle console is positioned adjacent to the second lateral side of the first frame when the reconfigurable console reinforcement bracket is in the first configuration, and the first lateral side of the vehicle console is positioned adjacent to the second lateral side of the first frame and the second lateral side of the vehicle console is positioned adjacent to the first lateral side of the first frame when the reconfigurable console reinforcement bracket is in the second configuration.

* * * * *